United States Patent
Huang (10) Patent No.: US 8,913,107 B2
(45) Date of Patent: Dec. 16, 2014

(54) SYSTEMS AND METHODS FOR CONVERTING A 2D IMAGE TO A 3D IMAGE

(75) Inventor: Samson Huang, Saratoga, CA (US)

(73) Assignee: Marvell World Trade Ltd., St. Michael (BB)

( * ) Notice: Subject to any disclaimer, the term of this patent is extended or adjusted under 35 U.S.C. 154(b) by 359 days.

(21) Appl. No.: 13/327,859

(22) Filed: Dec. 16, 2011

(65) Prior Publication Data
US 2012/0162396 A1    Jun. 28, 2012

Related U.S. Application Data (60) Provisional application No. 61/427,025, filed on Dec. 23, 2010, provisional application No. 61/478,171, filed on Apr. 22, 2011.

(51) Int. Cl.
*H04N 13/04* (2006.01)
*H04N 13/02* (2006.01)

(52) U.S. Cl.
CPC ......... *H04N 13/0264* (2013.01); *H04N 13/026* (2013.01)
USPC .............................................. 348/51

(58) Field of Classification Search
CPC ............ H04N 13/026; H04N 13/0264; H04N 13/0018; H04N 13/0022
USPC ........................................................ 348/44
See application file for complete search history.

(56) References Cited

U.S. PATENT DOCUMENTS

| | | | |
|---|---|---|---|
| 2001/0045979 A1* | 11/2001 | Matsumoto et al. | 348/43 |
| 2004/0189796 A1 | 9/2004 | Ho et al. | |
| 2009/0196492 A1* | 8/2009 | Jung et al. | 382/154 |
| 2009/0315981 A1* | 12/2009 | Jung et al. | 348/43 |
| 2011/0109619 A1* | 5/2011 | Yoo et al. | 345/419 |
| 2011/0254918 A1 | 10/2011 | Chou | |

FOREIGN PATENT DOCUMENTS

| | | |
|---|---|---|
| EP | 0704823 A2 | 4/1996 |
| TW | 201031179 | 8/2010 |

OTHER PUBLICATIONS

International Preliminary Report on Patentability dated Jul. 4, 2013 from corresponding/related International Patent Appl. No. PCT/US11/65369 filed Dec. 16, 2011.
International Search Report and Written Opinion from the European Patent Office for PCT/US2011/065369, mailed on Mar. 8, 2012.

* cited by examiner

*Primary Examiner* — Thai Tran
*Assistant Examiner* — Stephen Smith (57) ABSTRACT

Systems and methods are provided for converting a two dimensional (2D) image for three dimensional (3D) display. In one embodiment, a minimum depth for the 3D image is set to pixels in a bottom portion of the received 2D image. If the 2D image includes an object limiting the maximum image depth, then the maximum depth of the 3D image is set based on a location of the object in the 2D image. If the 2D image does not include an object limiting the maximum image depth, then the maximum depth of the 3D image is set to pixels in a top portion of the 2D image. A continuous depth function is generated from the minimum depth to the maximum depth and is used to generate a stereoscopic image from the 2D image.

20 Claims, 7 Drawing Sheets

SYSTEMS AND METHODS FOR CONVERTING A 2D IMAGE TO A 3D IMAGE

CROSS-REFERENCE TO RELATED APPLICATIONS

This application claims priority to the following applications, both of which are incorporated herein by reference in their entirety: U.S. Provisional Patent Application No. 61/427,025, filed on Dec. 23, 2010 and titled "3D TV That Can Play 2D Content In 3D"; and U.S. Provisional Patent Application No. 61/478,171, filed on Apr. 22, 2011 and titled "Method and Apparatus to Convert 2D Image and Video to 3D."

FIELD

The technology described in this patent document relates generally to three dimensional (3D) display technology.

BACKGROUND

With the continuing advancement of three dimensional (3D) display technology, 3D display devices, such as 3D televisions and 3D mobile devices, are becoming more readily available. However, because of the expense of 3D video production and the limited number of 3D cameras, among other reasons, there is still very little 3D content available on the market in comparison to the availability of 2D video and image products. An efficient way of converting existing 2D content to 3D is therefore highly desirable in the 3D market.

SUMMARY

In accordance with the teachings described herein, systems and methods are provided for converting a two dimensional (2D) image for three dimensional (3D) display. In one embodiment of the disclosure, a minimum depth for the 3D image is set to pixels in a bottom portion of the received 2D image. The received 2D image is processed to determine whether the 2D image includes an object that limits a maximum image depth. If the 2D image includes an object limiting the maximum image depth, then the maximum depth of the 3D image is set based on a location of the object in the 2D image. If the 2D image does not include an object limiting the maximum image depth, then the maximum depth of the 3D image is set to pixels in a top portion of the 2D image. A continuous depth function is generated from the minimum depth to the maximum depth. The continuous depth function is then used to generate a stereoscopic image from the 2D image.

In another embodiment of the disclosure, one or more objects are detected within the 2D image. A minimum depth is set to pixels in a bottom portion of the 2D image, and a maximum depth is set to pixels in a top portion of the 2D image. A knee point in the 2D image is set based on a location of the detected one or more objects. A continuous depth function is generated from the maximum depth to the minimum depth, wherein the continuous depth function is a piecewise linear function having a constant value from the maximum depth to the knee point and having a linear transition from the knee point to the minimum depth. The continuous depth function is used to generate a stereoscopic image from the 2D image.

In yet another embodiment of the disclosure, a received 2D image is processed to determine whether the 2D image includes one or more objects that are in motion between the 2D image and an adjacent 2D image in a video stream. Based on a determination that the 2D image includes one or more objects that are in motion, motion vector data associated with the one or more objects is used to determine depth information for the 2D image. The depth information is then used to generate a stereoscopic image from the 2D image.

DETAILED DESCRIPTION

Figure 1:
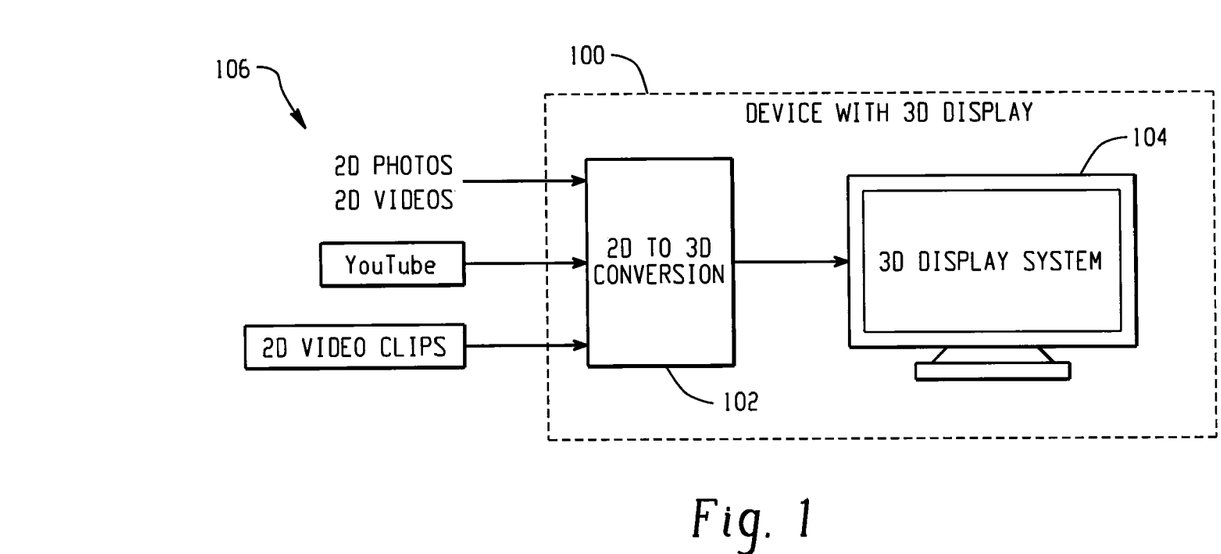
FIG. 1 is a diagram of an example device for converting 2D images or video for 3D display.

FIG. 1 is a diagram depicting an example of a device 100 for converting 2D images or video for 3D display. The device 100 may, for example, be a 3D television or a 3D mobile device, such as a smart phone, PDA or tablet. The example device 100 includes a 2D to 3D converter 102 and a 3D display system 104. The 2D to 3D converter 102 may, for example, be implemented using software that is stored in a memory and executed by one or more processors, using one or more hardware components (e.g., ASICs) or using a combination of hardware and software. The 3D display system 104 may, for example, by any known system for displaying 3D images and/or video, such as included in a typical 3D television or 3D mobile device.

In operation, the device 100 receives 2D images or video 106, such as 2D photos, 2D videos, a 2D video stream (e.g., YouTube), 2D video clips, or other 2D content, and converts the 2D content into a 3D format that may be displayed by the 3D display system 104. The 2D to 3D converter 102 extracts depth information from the 2D input 106 to build a depth map and then uses the depth map and the 2D input to generate a stereoscopic 3D image or video.

A stereoscopic image includes two views, one for the left eye and one for the right eye, that mimic a human's stereo (3D) vision. The human eyes are forward facing with a certain distance in between, and thus a pair of human eyes each see a similar view with minor differences in the horizontal direction. From the differences between the two views (and many other cues), humans can perceive depth. Similarly, to show a 3D image on a flat display, a stereoscopic image includes a view for the left eye and a view for the right eye with a distance in between. The distance between the two views in a stereoscopic image is called parallax disparity (horizontal displacement.) Depending on the polarity of disparity, an object in the image can appear to extend out of the display screen or to sink behind the display screen, thus producing a "3D" effect.

Figure 2:
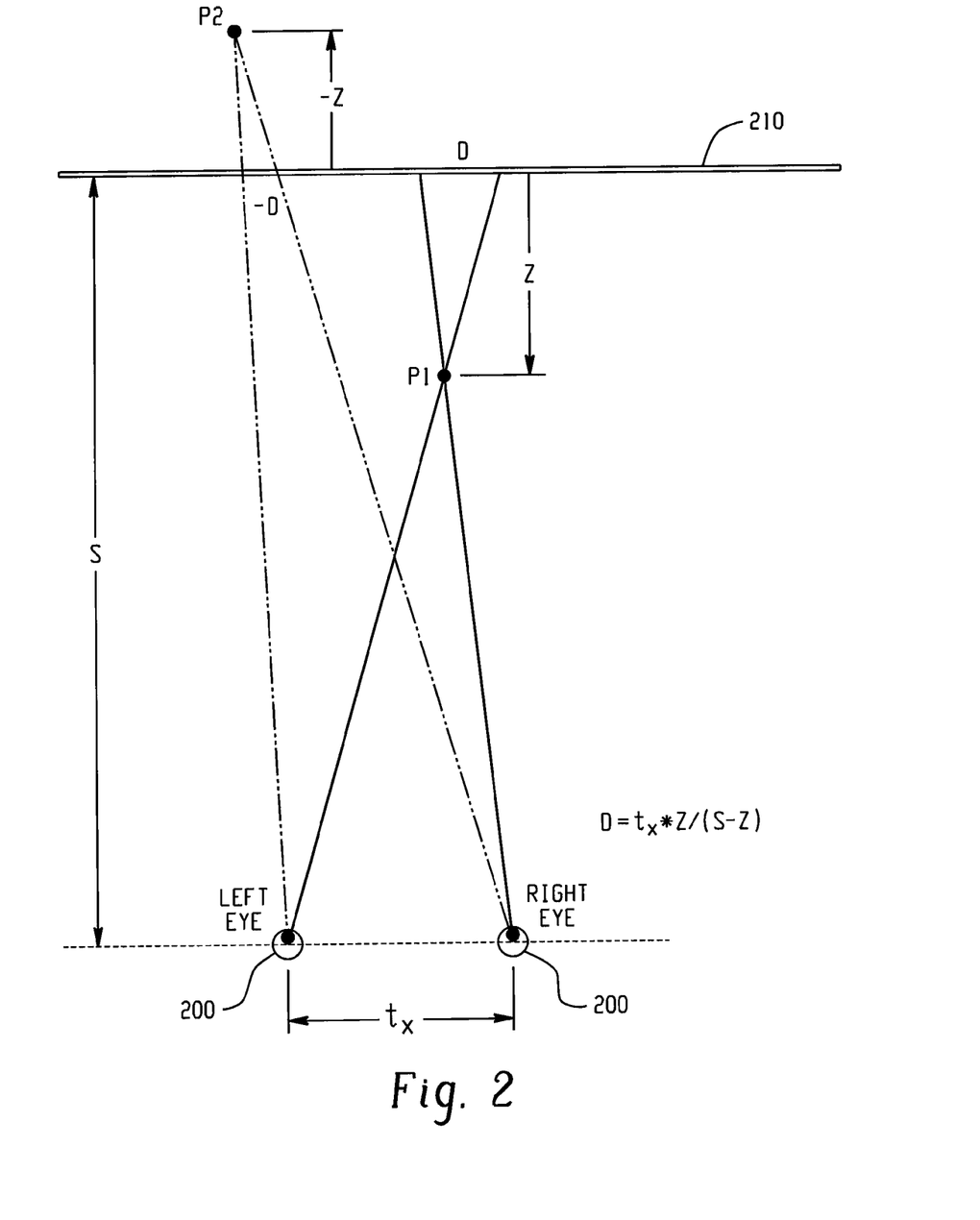
FIG. 2 is a diagram illustrating the relationship between parallax disparity and the appearance of depth in a 3D display.

FIG. 2 illustrates the relationship between parallax disparity and the appearance of depth in a 3D display. FIG. 2 shows a pair of eyes 200 that are a distance (S) from a display screen 210. The lines between the eyes 200 and the display 210 show the path of vision between each eye 200 and the respective left and right eye views of a stereoscopic image displayed on the display screen 210. As illustrated, the polarity of the parallax disparity D determines whether the object (P1 and P2) appears extending out of the screen or behind the screen. For instance, in the illustrated example, object P1 has a positive parallax disparity (D), and therefore P1 appears to extend a distance (Z) out of the screen. In contrast, object P2 in the illustrated example has a negative parallax disparity (−D) and thus appears a distance (−Z) behind the screen. Using the illustrated relationships, if the desired depth (Z) of an object is known, the parallax disparity (D) in the stereoscopic image may be calculated using known equations. For example, the following equation may be derived from the relationships illustrated in FIG. 2: $D/Z=t_x/(S-Z)$, where D is the parallax disparity, Z is the object depth, tx is the distance between the right and left eyes, and S is the distance between the eyes and the display screen. From this relationship, the parallax disparity (D) may be expressed as: $D=t_x*Z/(S-Z)$.

From the above equations, it can be seen that if depth information for an image (often referred to as a depth map) is available, then the parallax disparity may be easily calculated in order to produce the two views in a stereoscopic image. A typical 2D image does not include depth information. Depth information may, however, be estimated from a 2D image or video.

When a person views a 2D image, a certain perception of depth is achieved based on one or more visual cues. Many of these cues are the same as used to perceive depth in a scene viewed in the natural world. For instance, when a person views a scene in the natural world, some of the cues that are used to perceive depth include:
1. Stereopsis—different views for the left and right eyes, with nearer objects having a bigger disparity;
2. Accommodation of the eyeball—different eyeball focus for the left and right eyes;
3. Motion parallax—motion of nearer objects results in bigger displacement;
4. Occlusion of one object by another—the partially blocked object is recognized as being farther away;
5. Relative sizes of known objects or similar objects—near objects appear bigger;
6. Light and shade—nearer objects usually appear brighter;
7. Haze, desaturation and a shift to bluishness—nearer objects appear clearer; and
8. Change in size of textured pattern detail—nearer texture shows more pattern detail.

With the exception of cues 1 and 2, all of the cues listed above are also present in a typical 2D image or video. However, even though these depth cues exist in a 2D image or video, it is not trivial to extract a depth map because many of the cues are objective and relative. Out of cues 3-8 listed above, cue number 3 (motion parallax) is the best candidate for machine-based depth perception. Because the motion of nearer objects results in a bigger displacement in a video image than the motion of more distant objects, a significant amount of depth information may be extracted from a motion vector (MV). A motion vector is a map of pixel movement (i.e., displacement) in the temporal domain (e.g., from the current frame to the next frame in a video stream.) In a motion vector, objects having a bigger displacement are nearer, and objects having a smaller displacement are farther away. Based on this information, depth information may be extracted.

Figure 3:
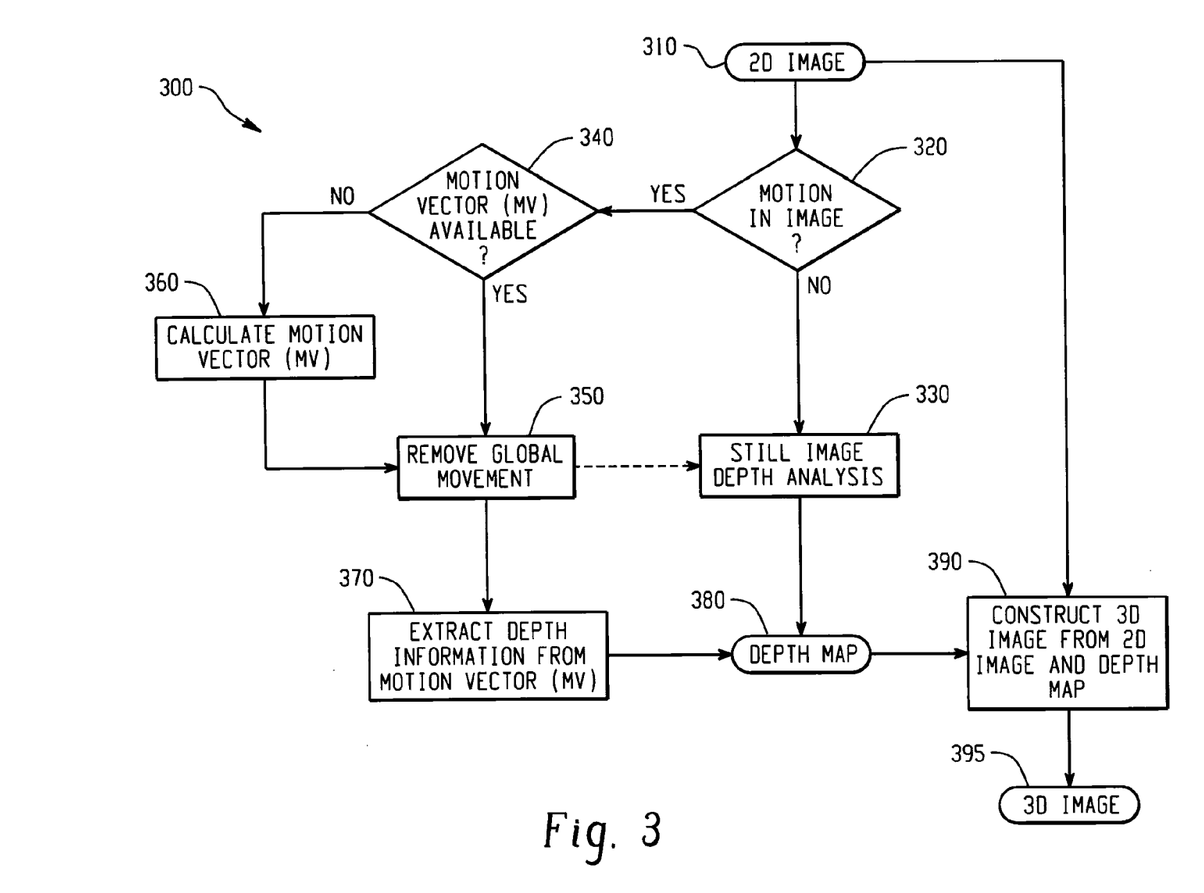
FIG. 3 is a flow diagram depicting an example method for generating a 3D image from a 2D image.

FIG. 3 is a flow diagram depicting an example method 300 for generating a 3D image from a 2D image. At 310, a 2D image is received. The 2D image 310 may, for example, be a frame in a 2D video or may be a solitary 2D image such as a digital photograph. At 320, the method determines whether the received 2D image includes an object in motion. For instance, if the received image 310 is part of a 2D video, then standard motion detection techniques may be used to determine whether there is motion between frames of the video. If the received image 310 is a solitary 2D image, then the method may assume that there is no motion. If it is determined that there is no motion associated with the received image, then the method proceeds to 330. Otherwise, if the received image 310 includes associated motion, then the method proceeds to 340.

At 340, the method determines if there is an existing motion vector (MV) associated with the received image. For instance, if the received image is part of a compressed video stream (e.g., MPEG2, MPEG4, H.264, etc.), then the motion vector (MV) may already be included in the video stream. If a motion vector (MV) is available, then the method proceeds to 350. Otherwise, if no motion vector is available for the received image, then a motion vector is calculated at 360 before the method proceeds to 350. The motion vector (MV) may be calculated, using standard techniques, by comparing the differences between adjacent frames in the video stream.

At 350, any global movements are removed from the motion vector (MV) data. Global movements in a video stream include, for example, movements caused by camera panning and zooming. If the whole image has a common motion vector (as detected, for example, by examining the motion vector histogram), then the motion is likely caused by panning. If the four corners of an image all have inward or outward motion vectors, then this motion is likely caused by zooming. Once any global movement has been removed from the motion vector data, the method proceeds to 370. Alternatively, if no motion vector data is left after the global movement has been removed, the method may instead proceed to 330 (as indicated by the dotted arrow in FIG. 3.)

At 370, the motion vector data is used to generate a depth map 380 for the received 2D image. If the received image does not have any associated motion, however, then one or more other techniques are used at 330 to extract the depth map information 380 from the received image. For example, depth cues 4 thru 8 in the above list may be used to automatically extract some amount of depth information from a still image. These cues may, however, only be able to provide relative depth, and therefore statistical data may also be used in combination with one or more of the cues to estimate depth. For example, the characters or objects in the center of the image are statistically more likely to be nearer the viewer than the background objects.

As another example, a face recognition function may be utilized at 330 (either alone or in combination with one or more other functions) to extract depth information from the received image. If faces are detected in the image using a typical facial recognition technique, then these people are usually nearer the viewer than the background.

As yet another example, a continuous depth map method, as described below with reference to FIGS. 4-5B, may be used at 330 to extract depth map information 380 from a still image.

At 390, the depth map 380 and the received 2D image 310 are used to generate the 3D image 395. This may be performed by converting the depth information (Z) into parallax disparities (D) in order to generate the stereoscopic views for the left and right eyes, for example using the equation described above with reference to FIG. 2.

Figure 4:
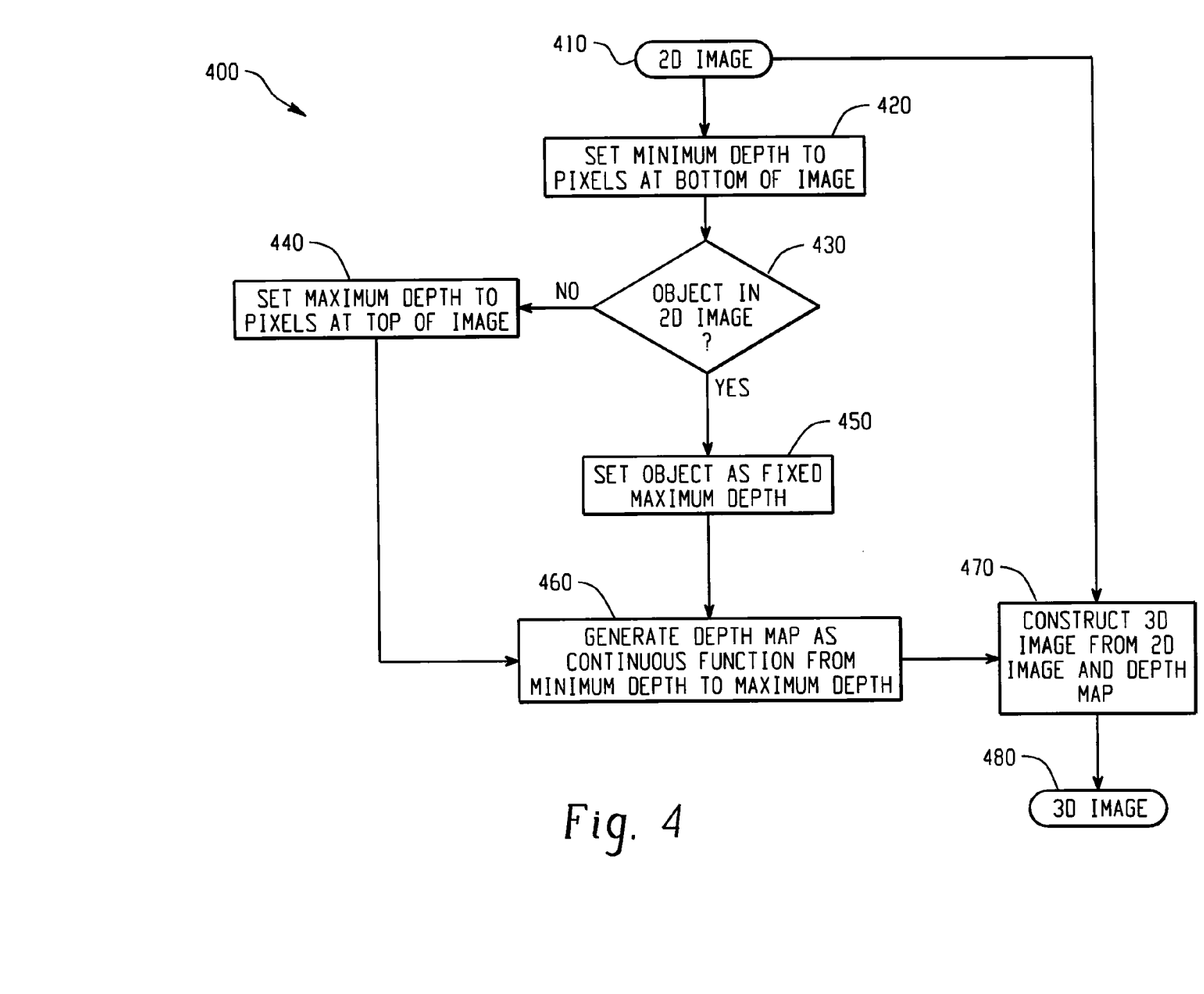
FIG. 4 is a flow diagram depicting an example method for generating a 3D image from a 2D image using a continuous depth map.
Figure 5A:
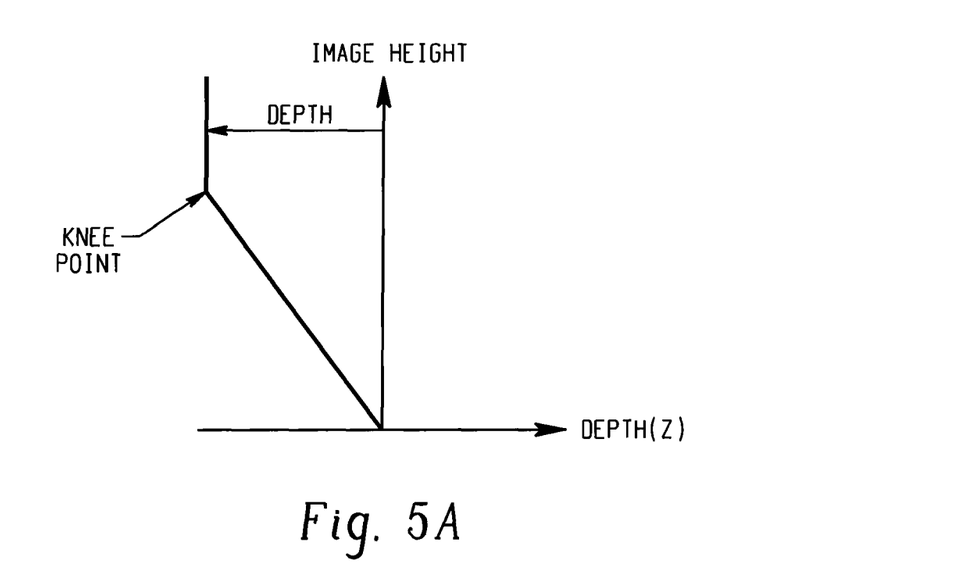
FIGS. 5A and 5B illustrate examples of a continuous depth function.
Figure 5B:
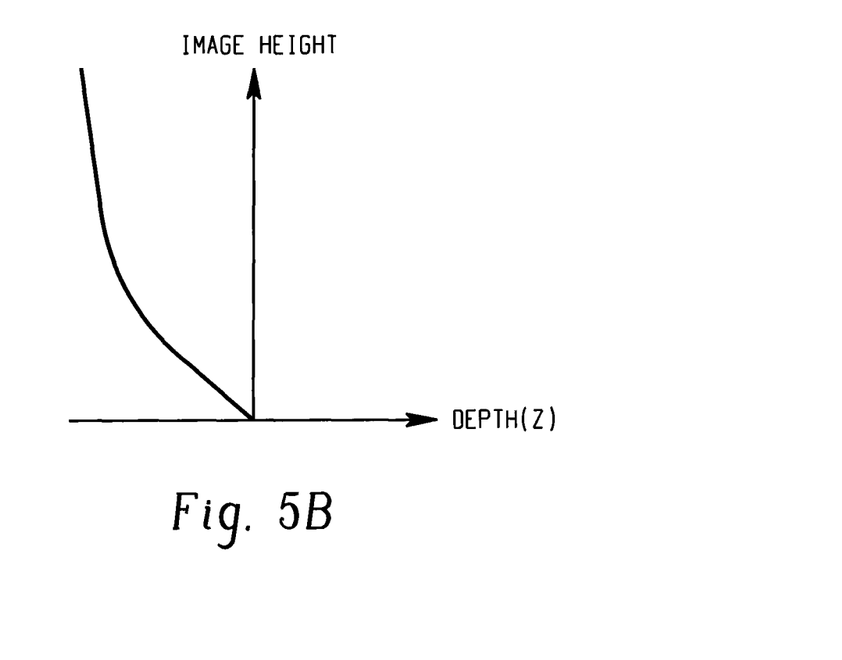

FIG. 4 is a flow diagram that depicts an example method 400 for generating a 3D image from a 2D image using a continuous depth map. There are many available methods for estimating depth map information from a 2D images. Some of these include object segmentation, foreground-background segmentation, edge detection, spatial frequency transformation, color segmentation, and geometric feature detection. Each of these techniques, however, result in a non-continuous depth map. Because non-continuous depth maps often cause non-continuous disparities (displacements) in the image, incorrect depth values may cause displacements in the wrong locations. This often results in highly visible image tearing or holes. The use of a continuous depth map (i.e., a depth map that is a continuous function) may therefore result in an improved 3D image, without tearing or holes.

The continuous depth map method depicted in FIG. 4 recognizes that in a 2D image the scene at the top of the image is typically farther away from the viewer than the scene at the bottom of the image. The method 400 therefore utilizes a continuous depth function with a small or zero depth value at the bottom of the image, and a large (negative) depth value at the top of the image. The continuous depth function may be piece-wise linear or non-linear, as illustrated in FIGS. 5A (showing a piece-wise linear function) and 5B (showing a non-linear function). Most 2D images do not extend out in depth in a straight line, but instead include some objects (e.g., buildings, trees, walls, etc.) that set a fixed depth in the image. This fixed depth results in a "knee point" in a piece-wise linear depth function, as illustrated in FIG. 5A. The knee point in the piece-wise linear function may, for example, be estimated based on empirical data or edge/feature detection techniques to identify the position of an object in the image.

With reference again to FIG. 4, the 2D image is received at 410. The 2D image 410 may, for example, be a frame in a 2D video or may be a solitary 2D image such as a digital photograph. At 420, a minimum depth value is set for the pixels at the bottom of the image. The minimum depth value may, for example, be a small (negative) depth value or zero. At decision block 430, the method attempts to identify any objects within the image that limit the maximum image depth. If no objects are detected, then a maximum (negative) depth value is set for the pixels at the top of the image at 440 (i.e., the maximum depth value is set to a negative number having an absolute value that is larger than the absolute value of the minimum depth value.) Otherwise, if an object is detected that limits the maximum image depth, then the location of the object is set as the fixed maximum (negative) depth at 450. For example, the location of the object may be set as the "knee-point" as shown in FIG. 5A.

At 460, a depth map is generated as a continuous function from the minimum depth value (set at 420) to the maximum (negative) depth value (set at 440 or 450). The continuous function may, for example, be a piece-wise linear function, as illustrated in FIG. 5A, or a non-linear function, as illustrated in FIG. 5B. For instance, in one embodiment, a piece-wise linear function may be used if an object is detected (with the object setting the knee-point in the function) and a non-linear function may be used if no object is detected.

At 470, the depth map and the received 2D image 410 are used to generate the 3D image 480. This may be performed by converting the depth information (Z) into parallax disparities (D) in order to generate the stereoscopic views for the left and right eyes, for example using the equation described above with reference to FIG. 2. The stereoscopic views may then be used to generate a 3D display using known techniques, which may be dependent on the data format of the particular 3D display device.

Figure 6:
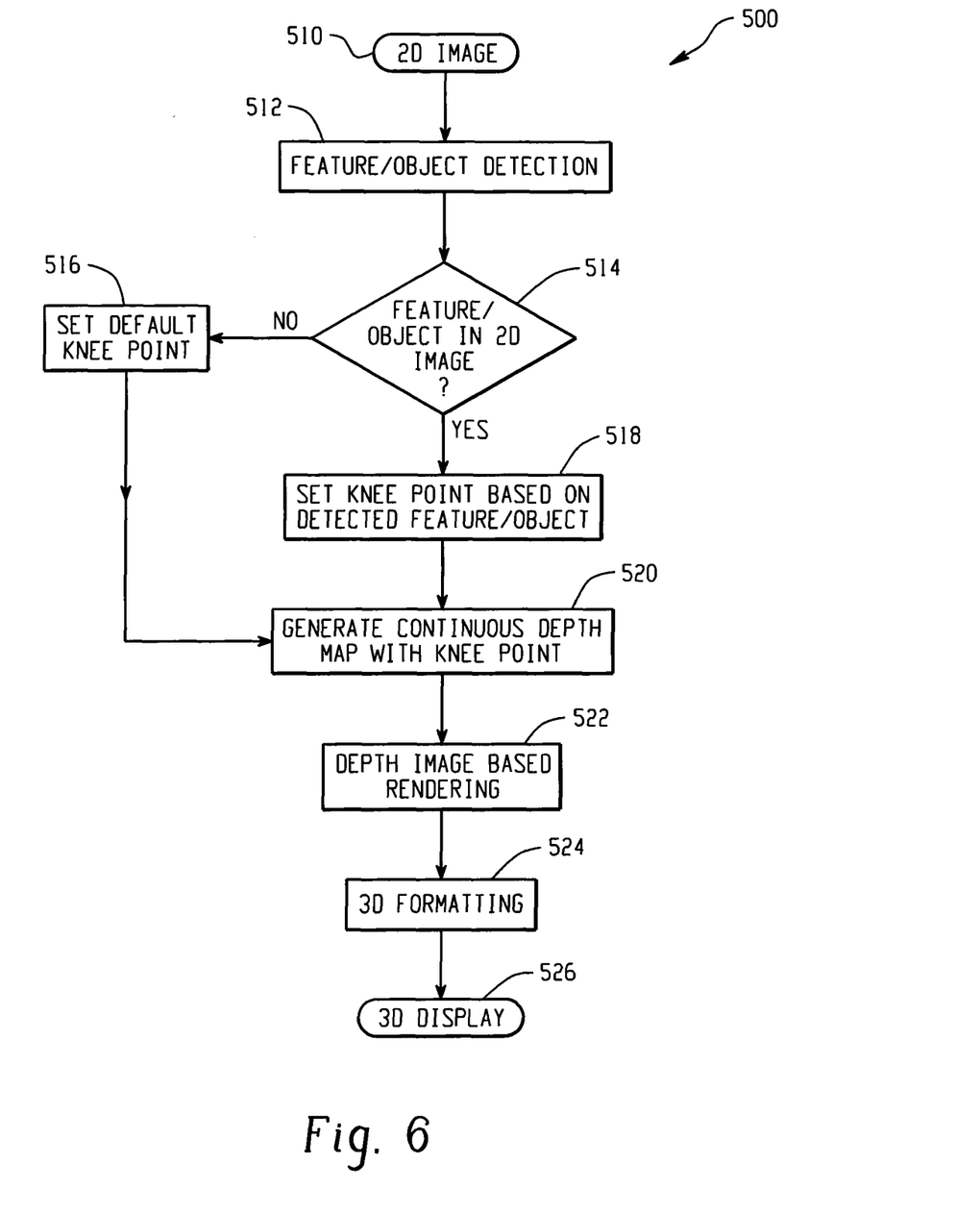
FIG. 6 is a flow diagram depicting another example method for generating a 3D image from a 2D image using a continuous depth map.

FIG. 6 is a flow diagram depicting another example method 500 for generating a 3D image from a 2D image using a continuous depth map. A 2D image is received at 510, which may, for example, be a frame in a 2D video or may be a solitary 2D image such as a digital photograph. The 2D image is then analyzed at 512 to detect any objects and/or features in the 2D image that would limit the maximum image depth. For instance, building, trees, or other objects may be detected that limit the maximum depth of the 2D image. Other features that may limit the maximum image depth may include, for example, a horizon or some other transitional feature within the image. Objects and/or features may be distinguished from the image background using one or more known edge detection schemes, such as Sobel, Canny, Laplace, or first and second order derivatives. Depending on the image resolution, edge detection may require a relatively large amount of processing power. In one embodiment, the image size may be scaled by sub-sampling in order to reduce the processing power required for edge detection. To avoid aliasing the 2D image may be low pass filtered prior to sub-sampling.

If one or more objects or other depth-limiting features are identified in the 2D image, then the method proceeds from decision block 514 to block 518 to set a knee point location based on the detected objects or features. Statistically in a typical image, the very top of the image is the background. Therefore, a knee point location in a piece-wise linear depth map (see, e.g., FIG. 5A) may be set by scanning down from the top of the image for detected objects or other depth-limiting features. When sufficient objects and/or features are detected at a certain row number in the 2D image, that row number is set as the knee point. For instance, the method may determine that there are a sufficient number of objects/features to set a knee point if the detected objects/features meet a pre-determined threshold based on the size of the object/feature and/or the number of objects/features. In this way, the knee point should provide a transition point between the image background and foreground. In one embodiment, the knee point may have a minimum value, such as ⅛ of the image height.

If no objects or other depth-limiting features are identified in the 2D image, then the method proceeds from decision block 514 to block 516 to set a default knee point. The default knee point may, for example, be set at ¼ of the image height.

At 520, a continuous depth map is generated using the knee point set in block 516 or 518. In this example method, depth is measured from the display screen surface. If an object appears sinking deep into the screen, then it has a positive depth value. If an object appears extending outside the screen, then it has a negative depth value. In this example, the depth map uses only positive depth values (i.e., the 3D image only extends into the screen.) By default, the background depth is set to 1/15, or 6.67%, of the image height. That is, if the image height is H, then the background depth $Z\_bg=H/15$. For example, if the image height is 600, then the default depth is 40. A depth of zero is assigned to the bottom row of the image.

A piece-wise linear depth map is generated by assigning the background depth ($Z\_bg$) value from the top of the image to the knee point. Then, the depth map makes a linear transition from $Z\_bg$ to 0 from the knee point to the bottom row of the image, as shown in the example depicted in FIG. 5A. The resulting piece-wise linear depth map is effective in covering most general outdoor and indoor scenes without causing annoying artifacts, such as frame tearing, holes, or one object in two separate depths.

At 522, the continuous depth map is used to render the original 2D image into stereoscopic (left-eye and right-eye) views, for example using a depth image based rendering (DIBR) process. A DIBR process converts depth into parallax disparity. For instance, if pixel A has a positive depth value of Z, it will proportionally generate a parallax disparity D, denoting a separation between the left pixel (A_left) and the right pixel (A_right). In the example method 500, disparity is made directly proportional to depth (Z) for simplicity. Thus, for pixel A with depth Z, the left pixel (A_left) is rendered D/2 to the left, and the right pixel (A_right) is rendered D/2 to the right. More precisely, with odd number cases, D_right=(int) (D/2), and D_left=D−D_right.

At the top of the image, Z=Z_bg. Thus, assuming Z_bg is an even number, D_left=D_right=Z_bg/2. The left view is therefore shifted to the left by D_left, and the right view is shifted to the right by D_right. When the left and right views are combined to reconstruct the 3D image, the right pixels are missing in the D_left region, and the left pixels are missing in the D_right region. In other words, the reconstructed 3D image width is shorter by D, causing "holes" in the left and right sides. These "holes" may be eliminated by cutting off the D_left and D_right regions. This results is a narrower 3D image, but without incorrect pixels.

At 524, the stereoscopic image is formatted for 3D display 526 based on the data format of the 3D display device.

Figure 7:
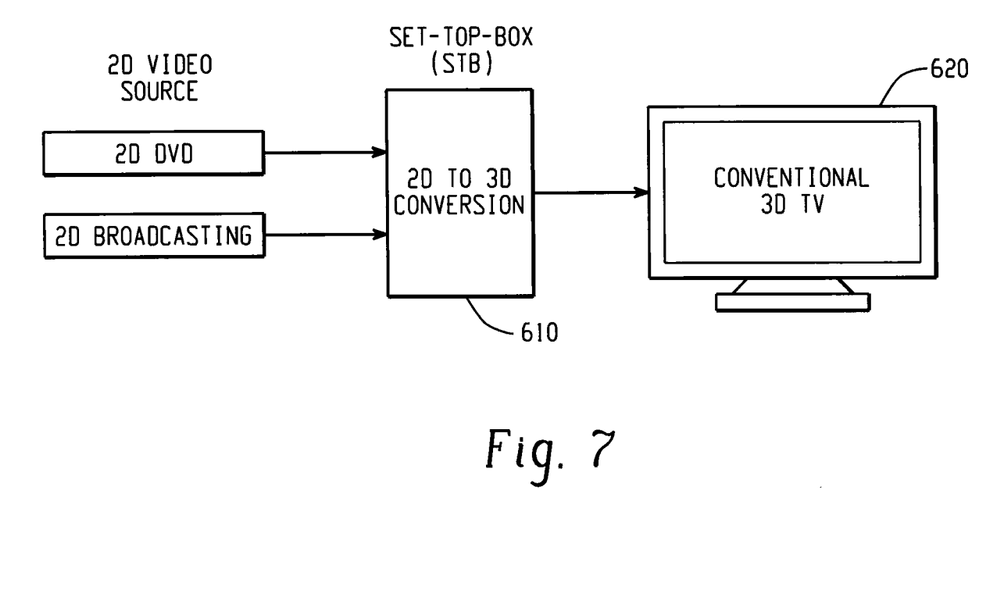
FIG. 7 is a diagram illustrating an example system for converting 2D images or video for 3D display.

This written description uses examples to disclose the invention, including the best mode, and also to enable a person skilled in the art to make and use the invention. The patentable scope of the invention may include other examples that occur to those skilled in the art. For example, FIG. 7 illustrates an alternative example in which the 2D to 3D converter 610 is included in a set-top-box connected to a 3D television 620 or some other 3D display device. In this example, the set-top-box 610 receives a 2D video or image (e.g., from a 2D DVD or 2D television broadcast) and converts the 2D image or video for 3D display using one or more of the methods described herein.

It is claimed:

1. A method of converting a two dimensional (2D) image for three dimensional (3D) display, comprising:
   setting a minimum depth to pixels in a bottom portion of the 2D image;
   determining whether the 2D image includes one or more objects that limit a maximum image depth;
   based on a determination that the 2D image includes one or more objects limiting the maximum image depth, setting the maximum image depth based on a location of the one or more objects in the 2D image;
   generating a continuous depth function from the minimum depth to the maximum image depth; and
   using the continuous depth function to generate a stereoscopic image from the 2D image.

2. The method of claim 1, further comprising:
   based on a determination that the 2D image does not include one or more objects limiting the maximum image depth, setting the maximum image depth to pixels in a top portion of the 2D image.

3. The method of claim 1, further comprising:
   based on a determination that the 2D image does not include one or more objects limiting the maximum image depth, setting the maximum image depth based on a default knee point location in the 2D image.

4. The method of claim 2, wherein if the 2D image includes one or more objects limiting the maximum image depth, then the continuous depth function is a piece-wise linear function.

5. The method of claim 2, wherein if the 2D image does not include one or more objects limiting the maximum image depth, then the continuous depth function is a non-linear function.

6. The method of claim 1, wherein the minimum depth setting is zero or a first negative number and the maximum image depth is a second negative number, wherein the second negative number has a larger absolute value than the first negative number.

7. The method of claim 1, wherein the minimum depth setting is zero or a first positive number and the maximum image depth is a second positive number, wherein the second positive number is larger than the first positive number.

8. A system for converting a two dimensional (2D) image for three dimensional (3D) display, comprising:
   a 3D display configured to display a stereoscopic image; and
   a 2D to 3D converter configured to:
      set a minimum depth to pixels in a bottom portion of the 2D image,
      determine whether the 2D image includes one or more objects that limit a maximum image depth,
      based on a determination that the 2D image includes one or more objects limiting the maximum image depth, set the maximum image depth based on a location of the object in the 2D image,
      generate a continuous depth function from the minimum depth to the maximum image depth, and
      use the continuous depth function to generate the stereoscopic image from the 2D image.

9. The system of claim 8, wherein the 2D to 3D converter is further configured to:
   based on a determination that the 2D image does not include one or more objects limiting the maximum image depth, set the maximum image depth to pixels in a top portion of the 2D image.

10. The system of claim 9, wherein if the 2D image includes one or more objects limiting the maximum image depth, then the continuous depth function is a piece-wise linear function.

11. The system of claim 9, wherein if the 2D image does not include an object limiting the maximum image depth, then the continuous depth function is a non-linear function.

12. A method of converting a two dimensional (2D) image for three dimensional (3D) display, comprising:
   detecting one or more objects within the 2D image that limit a maximum depth of the 2D image;
   setting a minimum depth to pixels in a bottom portion of the 2D image;
   setting the maximum depth to pixels in a top portion of the 2D image;
   setting a knee point in the 2D image based on a location of the detected one or more objects;
   generating a continuous depth function from the maximum depth to the minimum depth, wherein the continuous depth function is a piece-wise linear function having a constant value from the maximum depth to the knee point and having a linear transition from the knee point to the minimum depth; and
   using the continuous depth function to generate a stereoscopic image from the 2D image.

13. The method of claim 12, further comprising:
   using the stereoscopic image to generate an image formatted for 3D display.

14. The method of claim 12, wherein the knee point is set at a row in the 2D image based on a top edge location of the one or more objects.

15. A system for converting a two dimensional (2D) image for three dimensional (3D) display, comprising:
  a 3D display configured to display a stereoscopic image; and
  a 2D to 3D converter configured to:
    detect one or more objects within the 2D image that limit a maximum depth of the 2D image;
    set a minimum depth to pixels in a bottom portion of the 2D image;
    set the maximum depth to pixels in a top portion of the 2D image;
    set a knee point in the 2D image based on a location of the detected one or more objects;
    generate a continuous depth function from the maximum depth to the minimum depth, wherein the continuous depth function is a piece-wise linear function having a constant value from the maximum depth to the knee point and having a linear transition from the knee point to the minimum depth; and
    use the continuous depth function to generate a stereoscopic image from the 2D image.

16. The system of claim 15, wherein the 2D to 3D converter is further configured to use the stereoscopic image to generate an image formatted for 3D display.

17. The system of claim 15, wherein the knee point is set at a row in the 2D image based on a top edge location of the one or more objects.

18. The method of claim 1, wherein the determining of whether the 2D image includes the one or more objects that limit the maximum image depth includes:
  passing the 2D image through a low pass filter to generate a filtered image;
  reducing a size of the filtered image using a sub-sampling procedure to generate a reduced-size image; and
  performing edge detection on the reduced-size image to determine edges in the reduced-size image, wherein the determining of whether the 2D image includes the one or more objects that limit the maximum image depth is based on the edges.

19. The method of claim 1, further comprising:
  determining a number of the one or more objects that limit the maximum image depth; and
  comparing the number to a predetermined threshold, wherein if the comparison indicates that the number is higher than the predetermined threshold, the maximum image depth is set based on the location of the one or more objects in the 2D image.

20. The method of claim 1, further comprising:
  determining sizes of the one or more objects that limit the maximum image depth; and
  comparing each of the sizes to a predetermined threshold, wherein if the comparison indicates that the size is higher than the predetermined threshold, the maximum image depth is set based on the location of the object corresponding to the size.

* * * * *